April 14, 1931.   H. A. NELSON   1,801,104
STREET INDICATOR
Filed Nov. 19, 1930   2 Sheets-Sheet 1
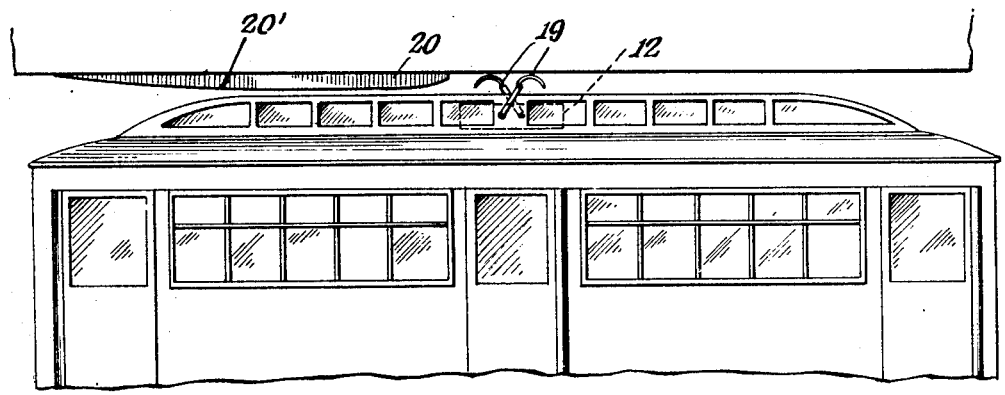
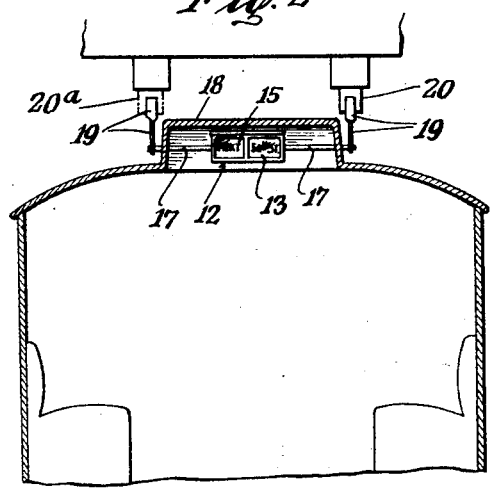
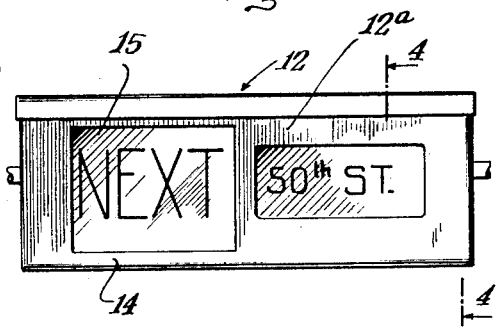
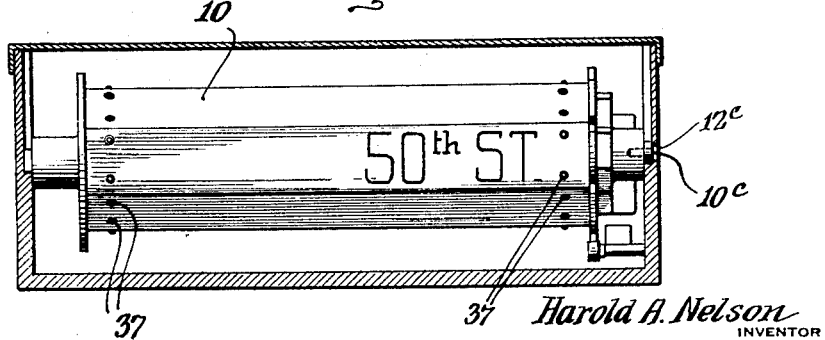
Harold A. Nelson
INVENTOR
BY Victor J. Evans
ATTORNEY April 14, 1931.　　H. A. NELSON　　1,801,104
STREET INDICATOR
Filed Nov. 19, 1930　　2 Sheets-Sheet 2

Harold A. Nelson
INVENTOR

BY Victor J. Evans
ATTORNEY

Patented Apr. 14, 1931

1,801,104

UNITED STATES PATENT OFFICE

HAROLD A. NELSON, OF BROOKLYN, NEW YORK

STREET INDICATOR

Application filed November 19, 1930. Serial No. 496,694.

This invention relates to so-called street indicators, that is, to indicators automatically operated by the movement of a track vehicle, for example, a trolley car or a subway train, to give an indication of the next stop (as the next street corner, or the next subway station); such automatic operation being caused by a movement imparted to an arm, hereinafter called the advancer, projected from the vehicle and engaged by an inclined plane or the like, hereinafter called the actuator, in a fixed location between each two predetermined stop points for the vehicle.

A large number of previous workers in the art have attempted to provide a practicable apparatus of the above general character; but, so far as I am aware, none of these workers has satisfactorily solved the problem in view of the fact that public utility transportation officials insist that any apparatus to be adopted:

(a) Must not be too bulky; and, above all, self-contained in a very shallow boxlike compartment hangable in the vehicle near the ceiling thereof.

(b) Must give a plurality of duplicate indications readable simultaneously by passengers at both ends of a car and gazing upwardly toward a central elevated point.

(c) Must be of extreme simplicity, ruggedness and reliability, to give low cost of installation and above all to be totally free from servicing except at very long intervals.

(d) Must not have anywhere within or without the same either springs or mechanical movements of any kind which incorporate the least approach to even comparative complexity or delicacy.

(e) Nevertheless, must not involve any possibility of imparting a shock or jar to any part of the apparatus whatever, at any time, whether or not the car body be high on its trucks, as when the car is fairly empty of passengers, or close down against said trucks due to load-caused compression of the truck-springs, as when the car is packed with passengers during rush hours,—these two conditions, as is well known, representing a difference in the car body height of as much as three inches in the case of the New York subway.

(f) Must include one or more endless bands or equivalents passing over suitable guiding means, and associated with purely mechanical, that is, non-electrical or non-magnetic, operating means for advancing said band or bands from one designation to another at the proper times, in one direction or another, according as the vehicle is travelling toward one appointed terminus or another.

(g) Must have an advancer means projecting above the roof of the vehicle when the latter is a subway car, and yet operable to cause functioning of said operating means by an actuator on the roof of the subway tunnel in cases where the clearance or vertical space available for said inclined actuator, above the highest point of the car roof is very small.

(h) Must have said operating means include a pair of operating devices, completely operably disconnected from each other at all times and under all conditions, and both such devices completely operably disconnected from the endless band aforesaid except while said band is being actually advanced in one direction or the other, according as the car is moving toward one terminus or the other, whereby the band or the like is completely free running, and hence easily manually, as by turning a crank permanently or temporarily keyed to one of a pair of drums or the like (for constituting the guiding means aforesaid), advanced in either direction for any distance desired, as to correct any noted inaccuracy which might otherwise exist due to having previously had to run the car over a switch or commonly disused track following an accident or other emergency.

The cardinal object of the present invention is to provide an indicator satisfying at once all the requirements hereinabove itemized.

Another important object is to provide an indicator as above, and one wherein said operating means includes two drums over which a single endless belt runs, pawl and ratchet couples, one couple associated with each drum to periodically fractionally rotate that drum in a direction opposite to that in which the other drum is similarly adapted to be rotated by its couple, and detent instrumentalities to prevent accidental overrunning of the belt in either direction; yet with the belt freerunning as described in paragraph (h), this due to the fact that, except when an advancer movement is actually causing one of said couples to give one of said drums a fractional rotation, both drums are free of any means whatever, from said couples or said detent instrumentalities or otherwise, capable of locking either drum against rotation in either direction.

Another important object is to provide such indicator, and one which shall have its said operating means so constructed that gravity and gravity alone is always the agent which does the actual work of changing the station indications as a necessary consequence of a movement of an advancer caused by the passage of the same over an actuator.

Another important object is to provide a weight-operated pawl, for each of a plurality of independently operating pawl and ratchet couples, wherein the weight itself coacts with other elements to throw the pawl without shock or jar to a certain position, and this a position to insure disengagement of the pawl from its ratchet.

Still another important object is to provide an indicator as above, wherein but a simple belt is employed, and that without slack and hence any necessity for devices for taking up slack, and yet a belt having the indicia for the respective stops or stations so arranged that a given indicium is exposed, and that only, in one direction in the car and an identical indicium is exposed, and that only, in the opposite direction in the car; with both these indicia always readable, rightside up, and without lateral reversal of the letters or numerals thereof.

Other ojects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show an embodiment of the invention as at present preferred.

In said drawings:

Fig. 1 is a view in side elevation, showing the upper part of a subway car, having said embodiment of the invention installed therein;

Fig. 2 is a transverse sectional view taken approximately through the center of the car;

Fig. 3 is an end elevation of the casing for the indicator, showing said casing end as seen in Fig. 2 but on an enlarged scale;

Fig. 6 is a transverse vertical section, taken on the line 6—6 of Fig. 4, except that here too the majority of the parts are shown in elevation.

Similar reference characters refer to similar parts throughout the several views of the drawings.

Figure 4:
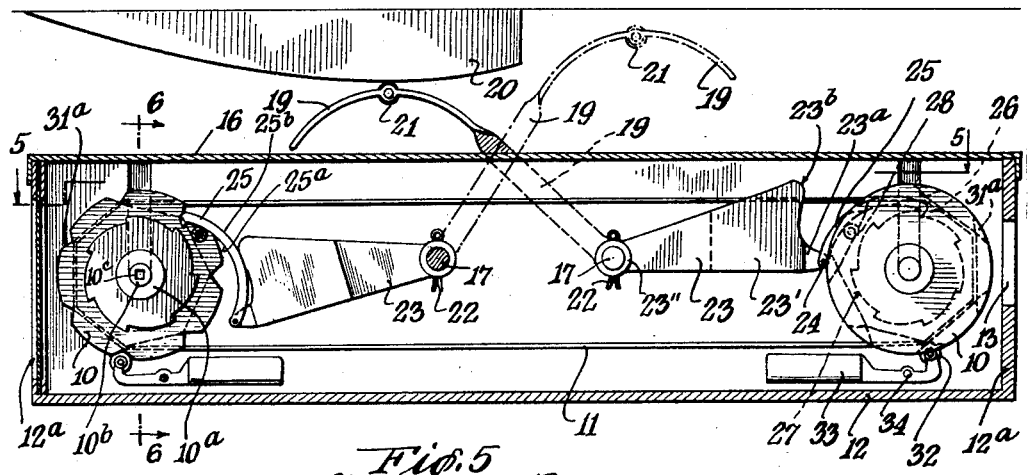
Fig. 4 is, on a somewhat more enlarged scale, a vertical longitudinal section through said casing, taken on about the line 4—4 of Fig. 3, but so drawn as to show the majority of the parts in side elevation.

Referring to said drawings in detail, a pair of drums 10 are provided, each including a number of flat sides to have each drum define a regular polygon in cross-section. As seen best from Fig. 4, there are seven such sides 10a; which number of sides is recommended; as repeated tests have indicated that where a single belt 11 running over said drums has its upper and lower stretches without material slack, as is the ideal belt arrangement, smoother belt action may be had, and the timing and stepping of the parts is easier so far as is concerned always halting a desired legend on said belt squarely and parallelly opposite an end wall 12a of a casing 12. This is important in the present case, because each such end wall has provided therein a sight window 13 through which simultaneously two legends on said belt may be viewed by passengers in opposite ends of the car; when the casing 12, as is preferred, is mounted at the center of the car and near the ceiling thereof, as shown clearly in Figs. 1 and 2. As will be seen best from Fig. 5, one half of the belt 11 is provided with a succession of legends or indicia running in one order and reading one way, and the other half of the belt is provided with a succession of legends or indicia running in the reverse order and reading in the opposite way. The length of the belt is such, compared to the width of each side of a drum, that preferably there are two continuous series of such legends all around the belt; and such legends are so arranged relative to the two halves of the belt that when a particular indicium is halted parallel to an end wall and between said wall and the drum side over which the part of the belt carrying said indicium is stretched flat, the same indicium is halted similiarly parallel to each opposite end wall of the casing. As will be noted, these halted indicia will be staggered relative to the width of the casing; and consequently the windows 13, as shown best in Fig. 5, are likewise staggered. It being desirable to cover up the upside down indicium at each end of the casing alongside each proper indicium rightside up opposite a window 13, the end walls of the casing may be arranged as closed wall sections, or, as is preferred, may be formed as framing structures 14 for a placard 15 carrying the word "next" or some equivalent or other appropriate information.

The casing 12 has a removable cover 16, and when such cover is removed, all the mechanism inside the casing may be easily removed, for inspection or repairs; as will become clear shortly. Of course, the casing is suitably hung, by straps or brackets (not shown) in the position in the car shown in Figs. 1 and 2; and before a cover removal as above, the casing will be temporarily taken down from its ceiling mount. Such a removal of the casing will also involve, in the present case, a disconnection of the inner ends of the pair of shafts 17 shown in Fig. 2, from the sides of the casing; these shafts having fixed to their outer ends, where the latter project beyond the car roof superstructure 18, by suitable means, advancers 19 independently depressible at their curved free ends when either of them by travel of the car in either direction is caused to move along an inclined plane 20 positioned above the car, as hung below the roof of a subway. Each such advancer has preferably an anti-friction roller, as indicated at 21 in Fig. 4; and as seen from Figs. 1 and 2 one advancer is inclined in one direction and the other in the opposite direction, the one shown to the left in Fig. 1 for depression by the actuator 20 of Fig. 1 while the car is traveling toward the right and sweeping said advancer under the actuator last mentioned. A similar actuator, but with its main or gradual ramp 20′ running in the opposite direction from that of the actuator shown in Fig. 1, is provided for the advancer on the other side of the superstructure 18, and consequently is located over the line of travel of the last mentioned advancer with the car. Two of such reversely arranged actuators, one shown in full lines at 20 in Fig. 2 and the other shown in dot and dash lines at 20a in Fig. 2, are arranged at proper distances ahead of each predetermined stop, as will be understood. Thus, in whichever way the car is traveling, the proper one of the two advancers 19 will be depressed, thus causing a rocking of one of the shafts 17 or the other.

When the casing 12 is set for operation near the ceiling of the car as shown in Figs. 1 and 2 and as above described, the inner end of each shaft 17, after being sent through a suitable opening in the side of the casing, which opening preferably also serves as a fairly loose journaling means for said shaft, has fixed thereon, by any suitable means, as by a quickly removable cotter pin such as indicated at 22 in Fig. 4, a main weight arm, hereinafter called the primary arm 23, the main weight thereof 23′ being preferably some distance removed from hub 23″ of said primary arm by which the same is fixed on its shaft 17 by use of the cotter pin 22 aforesaid.

As seen best from Fig. 5, there is one such primary arm 23 at each side of the casing, these arms being extended in opposite directions toward its own drum 10; the preferable arrangement being, also as shown, to have one such arm extended toward say the right hand end of one drum and the other such arm extended then toward the left hand end of the other drum,—this for most satisfactory design, specially from the standpoint of reducing as much as possible the width of the casing 12. Pursuant to this design, it will be seen that, similarly, the following identical parts, provided in two identical sets, each set for identical coaction with a different one of the drums and each set thus coacting independently of the other set, are associated with the drums as are the identical primary arms 23. With this understood, this specification will be clarified and shortened if but one of said sets of parts be described, as follows: Beyond its main weight mass 23′, primary arm 23 has a terminal ear 23a, to which is pivoted as at 24 a secondary arm 25 carrying at its free end a hook 26 to act as a pawl relative to a ratchet 27 fixed on that end of the appropriate drum 10 in a plane containing said secondary arm. This secondary arm 25 has a curved front face 25a, so shaped that when the primary and secondary arms are abnormally elevated as shown to the right in Fig. 4, as the result of a depression of the advancer 20 inclined toward the left in Fig. 4 by the actuator 20 there shown, such curved face has coacted with a roller 28 to arch the secondary arm well over the top of ratchet 27: these two arms now being positioned to perform a pure gravity drop as soon as the advancer last mentioned passes completely beyond the actuator last mentioned.

Figure 5:
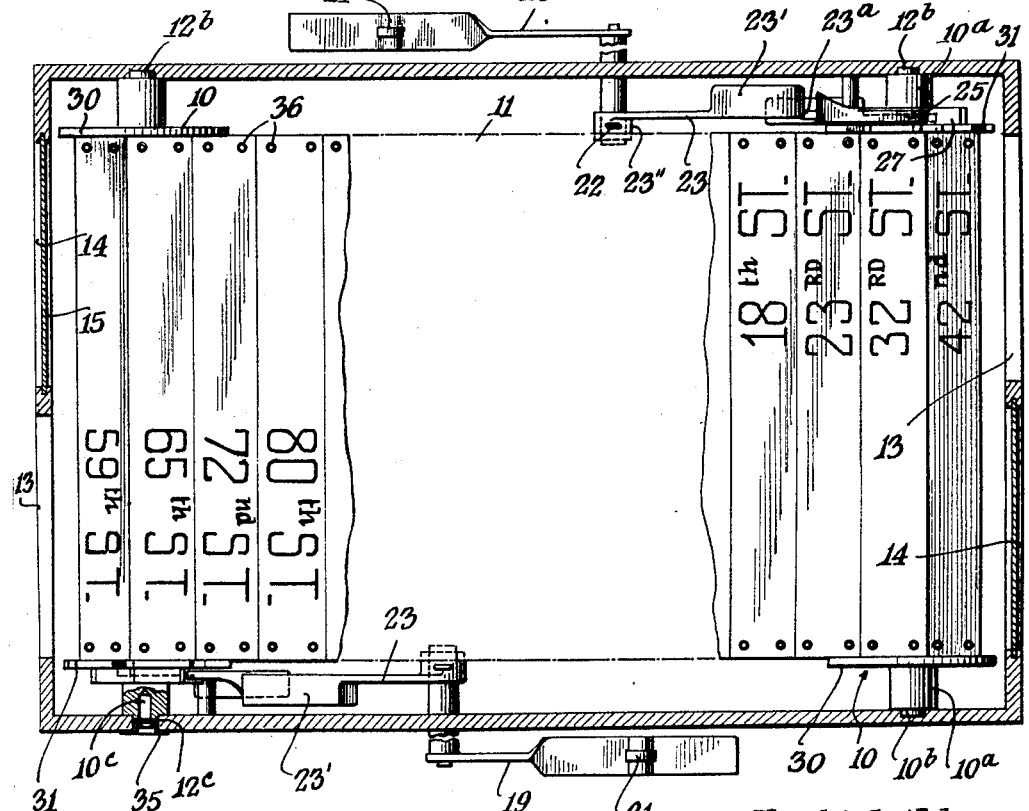
Fig. 5 is a horizontal sectional view taken on approximately the line 5—5 of Fig. 4.

Immediately thereafter, the primary and secondary arms will drop to the condition shown to the left in Fig. 4; thereby causing a rotation of the proper drum, to the extent of one tooth of its ratchet, to advance the belt one step, or to expose at the two end windows of the casing, identical indications as to the name of the next station or stop; the appropriate advancer being returned thereby to its normal elevated position. Thus, in the present case, the actuator, or element fixed relative to the road bed, moves the advancer merely to set the parts for a change-station operation; and it is gravity purely which subsequently brings about such operation. During this change-station operation, said curved face of the secondary arm, and said roller 28 likewise coact, but in this case to clear the pawl completely away from the ratchet as soon as the predetermined fractional rotation of the drum which is then acting as the driver has been completed.

In order to provide an absolutely smooth and non-jarring and non-wedging stop means for bringing of the primary and secondary arms to the condition last described, that is, as shown to the left in Fig. 4, these arms carrying above their point 24 of interpivoting, coacting stop surfaces, of special shape and of special location relative to the locus of the roller center, the curved front face of the secondary arm, the point of interpivoting of the two arms, the axis of the appropriate shaft 17, and the design, and the axis-placing, of the ratchet; these two surfaces being that indicated at 23b on arm 23 and that indicated at 25b on arm 25, in Fig. 4.

The parts are so designed that when an advancer is depressed to the limit as shown in Fig. 4, its pawl 26 is sent just enough beyond the ratchet tooth it is to seize, to click over the breast of such tooth, when the car is packed with passengers, as during rush hours, to settle the car body down to its lowest possible level on the car trucks; and it will thus be seen that, in view of the design and operation of the parts as already explained, their operation will always be identical, whether the car is fully loaded or empty of passengers, because, in the latter case, said pawl will merely be moved somewhat along the back of the next ratchet tooth ahead of the one it is shown in breast contact with in Fig. 4. In other words, in any case, the gravity caused drop of the primary and secondary levers operating said pawl, will be effective to rotate the proper drum one full tooth.

On each drum, on opposite sides of the belt 11, is a retaining disc or ring; one of which, indicated at 30, may have a smooth periphery, and the other of which, indicated at 31, and preferably alongside the ratchet on that drum, is provided with as many equally spaced notches 31a as the drum has sides, to-wit, seven. These notches and the intervening arcuate peripheral portions of each such disc 31a, form, with a roller 32 on the light end of a weighted lever 33 pivoted at 34, an impositive detent for each drum; as an additional precaution to insure an unintentional overrunning of the belt following a rotation of either ratchet one tooth.

Each drum, beyond its discs and its ratchet, is prolonged at opposite ends as a reduced hub portion 10a having centrally projected therefrom a stub shaft 10b; these stub shafts being journaled in the rounded bottoms of vertical grooves 12b cut in the inside surfaces of the side walls of the casing 12.

Any one of these stub shafts, as the one indicated to the left in Fig. 4 and to the lower left in Fig. 5 and to the right in Fig. 6, may be provided with a square hole 10c, and opposite such square hole may be provided a round aperture 12c in the side wall of the casing; whereby a suitable crank or the like, having a squared end to fit in said square hole 10c, may be temporarily coupled to one of the drums, to shift the belt to make a correctional adjustment whenever necessary. It may be desirable, to avoid too much wear on the casing 12 from operations like that last described, where such casing, as is preferred, is of hard wood, to fit into the aperture 12c a metal cup such as is indicated at 35 in Fig. 5.

It is also recommended, to avoid any possibility of slip of the belt 11 on either drum, to have grommeted holes 36 spaced along opposite sides of the belt as indicated in Fig. 5, these to act as sprocket chain elements relative to properly positioned pins, such as those indicated at 37 in Fig. 6, on the drums.

The operation of the indicator of the present invention should be completely clear in all respects from the foregoing description, as well, also, as the fact that the illustratively described embodiment satisfies completely all the objects and aims of the invention hereinabove anywhere set forth.

Considerable particularities of description, as to materials, part details, dimensions, capacities and utilities may have been herein indulged in, but it will be understood that these statements, made with particular reference to that one, and the one now preferred, of the many possible embodiments of the invention which is illustrated in the drawings, are not in any way to be taken as definitive or limitative of the invention. Inamuch as many changes could be made in the above constructions, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described, and all statements of the scope of the invention which, as a matter of language, might be said to fall therebetween.

In other words, the scope of protection contemplated is to be taken solely from the appended claims, interpreted as broadly as is consistent with the prior art.

I claim:

1. In a street indicator, the combination of a pair of drums; a single endless belt running over said drums, a casing for said drums having end walls which have sight openings therein, said openings being staggered laterally of the belt whereby substantially one half width of the belt will be seen through one opening and substantially the other half width of the belt will be seen through the other opening; a ratchet fixed on and rotating with each drum, said ratchets having the same number of identical teeth but with the teeth extended on one ratchet in an opposite direction to that on the other ratchet, and means normally completely disengaged from both ratchets, including a plurality of gravity responsive mechanisms, each of such mechanisms being always totally independent of the other, one of said mechanisms for temporarily coacting with one of said ratchets to rotate the latter to the extent of one tooth and hence to move said belt one step in one direction and the other of said mechanisms for similarly coacting with the other ratchet to move said belt one step in the opposite direction according to in which direction a car equipped with said indicator is travelling; each of said mechanisms including a pivoted advancer projected upwardly from the casing and above the car roof and having a free end inclined in a direction of travel of said car, said advancers having said free ends inclined in opposite directions.

2. The indicator defined in claim 1, wherein each of said drums includes a number of flat sides to define a regular polygon in cross-section and the number of teeth on each ratchet conforming to the number of sides of each drum, and each of said mechanisms including a primary arm swinging with the appropriate advancer and a secondary arm swinging on the primary arm, said secondary arm having a tooth near its free end to act as a pawl relative to the appropriate ratchet, a guiding means including a roller on a fixed axis and a curved surface on the secondary arm always contacting said roller by the weight of said secondary arm, said guiding means serving to throw said pawl from ineffective to effective relation with said ratchet when the appropriate advancer is rocked on its pivot a predetermined distance.

3. The indicator defined in claim 1, wherein each of said drums includes a number of flat sides to define a regular polygon in cross-section and the number of teeth on each ratchet conforming to the number of sides of each drum, and each of said mechanisms including a primary arm swinging with the appropriate advancer and a secondary arm swinging on the primary arm, said secondary arm having a tooth near its free end to act as a pawl relative the appropriate ratchet, a guiding means including a roller on a fixed axis and a curved surface on the secondary arm always contacting said roller by the weight of said secondary arm, said guiding means serving to throw said pawl from ineffective to effective relation with said ratchet when the appropriate advancer is rocked on its pivot a predetermined distance, and a gravity means including said two arms and said roller for lowering both arms to rotate said ratchet one tooth.

4. The indicator defined in claim 1, wherein each of said drums includes a number of flat sides to define a regular polygon in cross-section and the number of teeth on each ratchet conforming to the number of sides of each drum, and each of said mechanisms including a primary arm swinging with the appropriate advancer and a secondary arm swinging on the primary arm, said secondary arm having a tooth near its free end to act as a pawl relative to the appropriate ratchet, a guiding means including a roller on a fixed axis and a curved surface on the secondary arm always contacting said roller by the weight of said secondary arm, said guiding means serving to throw said pawl from ineffective to effective relation with said ratchet when the appropriate advancer is rocked on its pivot a predetermined distance, and a gravity means including said two arms and said roller for lowering both arms to rotate said ratchet one tooth, said guiding means coacting with the pivot location of said primary arm and said gravity means to collapse said two arms toward each other above their point of interpivoting, and means including said guiding means and abutting surfaces on the two arms for limiting such collapse and bringing said pawl finally to ineffective position relative to said ratchet following completion of said ratchet rotation.

5. In a street indicator including a drum driven endless belt and a ratchet on said drum, the combination of an operating mechanism for said ratchet including a pivoted advancer projected upwardly above the car roof and having a free end inclined in a direction of travel of said car, a primary arm extended toward said ratchet and coaxially pivoted with said advancer and fixedly connected thereto to swing therewith, a secondary arm pivoted on and extended in prolongation of the primary arm having a curved front face disposable to arch over the top of said ratchet and having a hook at its free end to act as a pawl relative to its said ratchet, there being provided for coaction with said face of said secondary arm a roller with an axis so located relative to the ratchet axis and to the advancer axis and to the arcuate line of travel of the pivotal connection between the two arms that on a depression of said free end of said advancer to a predetermined extent, said secondary arm will be disposed to the position last described, said primary and secondary arms being sufficiently massive and of sufficiently heavy material to collapse toward each other by a purely gravitational drop, and under the guidance of said roller, while overcoming the weight of the advancer and simultaneously overcoming all resistance in the device against movement of said belt a predetermined distance, thereby pulling said hook first to rotate said ratchet one tooth to move the belt said distance and immediately thereafter swinging said secondary arm relative to said primary arm to a position clear of said ratchet.

6. The indicator defined in claim 5, wherein said primary arm and said secondary arm carry elements which abut as the secondary arm swings finally to the position last mentioned, said surfaces and said roller axis and the pivotal points of both arms being so related as to cause such abutment to occur substantially simultaneously with the completion of a one-tooth rotation of the ratchet.

7. The indicator defined in claim 5, wherein stop means are provided for smoothly halting said secondary arm when it reaches aforesaid position clear of said ratchet, said means including said roller, said curved face of the secondary arm, and surfaces on the primary and secondary arms above their point of interconnection which abut non-wedgingly when said secondary arm reaches the position last mentioned.

8. In a street indicator, the combination of a pair of drums; a single endless belt running over said drums; a casing for said drums having end walls which have sight openings therein, said openings being staggered laterally of the belt whereby substantially one half width of the belt will be seen through one opening and substantially the other half width of the belt will be seen through the other opening; a ratchet fixed on each drum, said ratchets having the same number of identical teeth but with the teeth extended on one ratchet in an opposite direction to that on the other ratchet; and means normally completely disengaged from both ratchets, including a plurality of gravity responsive mechanisms, each of such mechanisms being always totally independent of the other, one of said mechanisms for temporarily coacting with one of said ratchets to rotate the latter to the extent of one tooth and hence to move said belt one step in one direction and the other of said mechanisms for similarly coacting with the other ratchet to move said belt one step in the opposite direction according to in which direction a car equipped with said indicator is travelling; each of said mechanisms including a pivoted advancer projected upwardly from the casing and above the car roof and having a free end inclined in a direction of travel of said car, said advancers having said free ends inclined in opposite directions, and each of said mechanisms also including oppositely extending primary arms each extended toward its appointed ratchet and coaxially pivoted with one of said advancers and fixedly connected thereto to swing therewith, each of said mechanisms further including a secondary arm pivoted on and to extend in prolongation of the primary arm first mentioned, each such secondary arm having a curved front face disposable to arch over the top of its ratchet and having a hook at its free end to act as a pawl relative to its said ratchet, there being provided for coaction with said face of each secondary arm a roller with an axis so located relative to the ratchet axis and to the advancer axis and to the arcuate line of travel of the pivotal connection between the two arms that on a depression of said free end of said advancer to a predetermined extent, said secondary arm will be disposed to the position last described; in each of said mechanisms said primary and secondary arm being sufficiently massive and of sufficiently heavy material to collapse toward each other by a purely gravitational drop, and under the guidance of said roller, while overcoming the weight of the advancer and simultaneously overcoming all resistance of said drums and of the belt against movement of the latter a predetermined distance thereby pulling said hook first to rotate its ratchet one tooth and to move the belt said distance and immediately thereafter swinging said secondary arm on said primary arm to a position clear of said ratchet.

9. The indicator defined in claim 8, wherein in each mechanism said primary arm and said secondary arm each carries a surface one to abut the other and thereby coact with said roller to constitute a gravity held but non-wedging stop for the two arms on the aforesaid swinging of the secondary arm to clear the ratchet.

In testimony whereof I hereby affix my signature.

HAROLD A. NELSON.